United States Patent [19]

Norton et al.

[11] 3,734,187

[45] May 22, 1973

[54] OIL RECOVERY WITH SULFOMETHYLATED POLY (LOWER ALKYL VINYL ETHER/MALEIC ANHYDRIDE)

[75] Inventors: Charles J. Norton; David O. Falk, both of Denver, Colo.

[73] Assignee: Marathon Oil Company, Findlay, Ohio

[22] Filed: Dec. 20, 1971

[21] Appl. No.: 210,203

[52] U.S. Cl. ........ 166/275, 166/305 R, 252/8.55 D, 166/274
[51] Int. Cl. .............................................. E21b 43/22
[58] Field of Search...... 166/273–275, 305 R, 252; 252/8.55 D; 260/27, 895

[56] References Cited

UNITED STATES PATENTS

| | | | |
|---|---|---|---|
| 2,759,902 | 8/1956 | Claudi-Magnussen et al. | 260/27 R |
| 2,901,457 | 8/1959 | Stoner et al. | 260/895 |
| 3,070,158 | 12/1962 | Roper et al. | 166/275 |
| 3,208,518 | 9/1965 | Patton | 166/275 X |
| 3,343,601 | 9/1967 | Pye | 166/275 X |
| 3,399,725 | 9/1968 | Pye | 166/275 |
| 3,543,855 | 12/1970 | Blatz et al. | 166/275 X |
| 3,679,000 | 7/1972 | Kaufman | 166/275 X |

*Primary Examiner*—Stephen J. Novosad
*Attorney*—Joseph C. Herring et al.

[57] ABSTRACT

Poly(lower alkyl vinyl ether/maleic anhydride) copolymer is dissolved in ammonium hydroxide and reacted simultaneously with formaldehyde and sodium sulfite, e.g., for 10 hours at 50°C. to produce an improved thickening agent for secondary recovery of petroleum. Optionally the reaction with formaldehyde or with sodium sulfite can be omitted.

7 Claims, No Drawings

3,734,187

OIL RECOVERY WITH SULFOMETHYLATED POLY (LOWER ALKYL VINYL ETHER/MALEIC ANHYDRIDE)

CROSS REFERENCES TO RELATED APPLICATIONS

The following U.S. Pat. applications relate to the general field of the present invention: Ser. No. 193,740 filed 10 - 29 - 71; Ser. No. 209,479 filed 11 - 26 - 71.

BACKGROUND OF THE INVENTION

1. Field of the Invention

The present invention relates to the injection into formations of fluids comprising water classified in Class 166, subclasses -275 and -305 of U.S. Patent classification system.

2. Description of the Prior Art

The prior art reviewed in the aforementioned copending applications and the GAF Corp. Bulletin discussed below is of general pertinence to the present application.

Preparation of poly(methyl vinyl ether/maleic anhydride) and uses for this copolymer sold by General Aniline and Film Corporation under the tradename Gantrez AN is taught in GAF Corp. Technical Bulletin 7543-017, dated 1965. U. S. Pat. No. 3,023,242 relates to the sulfomethylation of acrylonitrile in the presence of sulfuric acid and water to produce monomeric acrylic acid amide.

None of the above prior art teaches sulfomethylation of poly(lower alkyl vinyl ether/maleic anhydride), refered to herein as "PAVE/MA," copolymers and none teaches the use of such copolymers with sulfomethylation in the control of viscosity of aqueous solutions used in supplemented recovery of petroleum.

SUMMARY OF THE INVENTION

General Statement of the Invention

According to the invention, lower alkyl vinyl ether e.g., methyl vinyl ether, propyl vinyl ether, isopropyl vinyl ether, hexyl vinyl ether, is copolymerized conventionally with maleic anhydride, the resulting copolymer is treated with ammonia or ammonium hydroxide to form the partial amide-ammonium salt and this salt is in turn treated with formaldehyde and thereafter or simultaneously with ammonium or alkali metal salt sulfite (including bisulfites, etc.) to form an at least partially sulfomethylated copolymer. Aqueous solutions of the sulfomethylated copolymer are useful in increasing the viscosity of drive fluids used in the supplemented recovery of petroleum from subterranean formations.

In general, enhancing the polyionic character of mobility control agents used in supplemented recovery of petroleum provides enhanced recovery. Achieving this enhancement of polyionic character through use of sulfonate groups provides a mobility control agent with good ability to sustain viscosity in the presence of brine and lime, usually present in the connate waters of petroleum-bearing formations. The present invention first accomplishes the copolymerization of lower alkyl vinyl ether with maleic anhydride to provide mobility control agents of enhanced efficiency. Further, in preferred embodiments, these copolymers can be methylolated by treatment with formaldehyde. In still more preferred embodiments, the recovery of petroleum can be substantially enhanced by sulfomethylating such copolymer by treatment with formaldehyde sequentially or simultaneously. Such sulfomethylated PAVE/MA copolymers provide a high level of sulfonate groups per molecule with the attendant enhanced ionic character and petroleum recovery efficiency.

In previous investigations, it has been determined that sulfomethylation of partially hydrolyzed polyacrylamide proceeds only with difficulty or not at all. It was therefore surprising to discover that sulfomethylation can be accomplished in the PAVE/MA molecule which contains the amide group on a carbon atom adjacent to a carbon atom to which is attached a carboxyl group. On inspection of the PAVE/MA molecule, it seemed likely that electrostatic repulsion would preclude satisfactory sulfomethylation of the amide groups. Surprisingly, experimental evidence has shown that sulfomethylation of poly (methyl vinyl maleic anhydride) copolymer is possible, permitting the polyionic character of the polymer molecule to be substantially enhanced.

Utility of the Invention

The present invention, by increasing the viscosity, and oil recovery efficiency, provides substantially improved efficiencies and economies when used as, or in connection with, displacement fluids for the recovery of petroleum from subterranean formations. In addition, the compositions and processes of the present invention can be utilized for the formulation of controlled density fluids, e.g., for ore flotation, liquid-solid separation processes.

DESCRIPTION OF THE PREFERRED EMBODIMENTS

Starting Materials: Poly(lower alkyl vinyl ether/maleic anhydride) copolymer: This copolymer is readily synthesized or can be purchased in the form of commercially available finished copolymers e.g., General Aniline and Films Gantrez AN brand of poly(methyl vinyl ether/maleic anhydride) or can be produced according to the techniques of U. S. Pat Nos. RE 23,514, 2,882,257, 2,746,837, 2,759,902, 2,901,457.

Homogeneous solution of emulsion polymerization techniques may be employed. Copolymerization of suitable portions (0.1 to 0.9 moles each) of an alkyl vinyl vinyl ether and maleic anhydride is conveniently carried out in non-hydroxylic organic solvent, e.g., benzene. The polymerization may be initiated with a wide variety of peroxidic (e.g., benzoyl peroxide) or redox (e.g., triethanol amine-ammonium persulfate) radical reaction initiator with suitable initiation rate, preferably in a concentration in the range of from about 0.0001 to about 0.01 moles per mole of monomer. Such radical reaction initiators undergo thermal decomposition and initate the reaction in the temperature range of from about 0° to about 300°C. Pressures are preferably approximately atmospheric or slightly above due to solvent and reactant vapor pressures. However, under specialized circumstances subatmospheric or superatmospheric can be employed. Reaction times are preferably in a range of from about 0.01 to about 20, more preferably from about 0.1 to about 10, and most preferably from about 0.2 to about 5 hours.

The copolymer molecular weight should preferably be in the range of from about 1 to about 100, more preferably from 2 to about 50, and most preferably from 3 to about 12, million.

For purposes of the present invention, the injected aqueous solution should contain from about 50 to about 5,000, more preferably from about 100 to about 2,000, and most preferably from about 200 to about 1,500 parts per million by weight of the sulfomethylated copolymer. High-shear mixing should be avoided as it may cause rupture of the molecule, reducing effective molecular weight and viscosity increasing properties.

Water: Water for dissolving the copolymer and sulfomethylated copolymer will preferably be fresh water but can be brackish or slightly saline, e.g., as in connate water. In some situations there may be some advantage in partial treatment of the water to remove deleterious impurities.

Formaldehyde: The formaldehyde can be in the form of a liquid solution (formalin) preferably containing about 37 percent by weight formaldehyde which is the normal commercially available strength. The percent by weight of formaldehyde in the solution is not narrowly critical and can be adjusted to give the desired incorporation into the product. The formaldehyde can be in a gaseous state and bubbled directly into the aqueous solution of copolymer. Also, paraformaldehyde can be employed either by heating to form gaseous formaldehyde or by dissolving directly into the aqueous solution of copolymer.

Preferably from about 0.01 to about 10.0, more preferably from about 0.1 to about 5, and most preferably from about 0.5 to about 3 moles of formaldehyde per mole of amide in the PAVE/MA will be used in the invention.

Sulfites: The sulfites for use with the present invention will be inorganic sulfites, including ammonium sulfite which acts like a metal sulfite. "Sulfites" also includes bisulfites and metabisulfites. Sodium sulfite or bisulfite is a preferred source of sulfite ion. However, any non-interfering compound which forms bisulfite or sulfite ions in the reaction mixture may be utilized. By "non-interfering bisulfites" is meant those bisulfite-forming compounds which do not cause undesirable side reactions including among others: alkali sulfites, alkaline earth sulfites, alkali bisulfites, alkaline earth bisulfites, ammonium sulfite, ammonium bisulfite, the corresponding pyrosulfites and meta-bisulfites. Preferably from about 0.01 to about 2.0, more preferably from about 0.05 to about 1, most preferably from about 0.1 to about 0.5 mole of sulfite per mole of acrylamide monomer unit in the PAVE/MA will be used in the invention.

pH Control in formaldehyde treatment step: It has been discovered that the reaction is greatly enhanced by being conducted at a pH within the range of from about 7.5 to about 11, more preferably from 8.0 to about 10.5, and most preferably from 10 to about 10.5. The pH range can be readily achieved by the use of buffers, e.g., trisodium phosphate, triethanolamine, sodium bicarbonate-carbonate, boric acid-borate, and borax.

pH control in sulfite treatment step: It has been discovered that the reaction with sulfite is most desirably conducted at a pH within the range of from about 9 to about 14, more preferably from about 9.5 to about 13.5, and most preferably from about 10 to about 13. The pH range can readily be achieved by the use of buffers, e.g., trisodium phosphate, sodium polyphosphate, triethanolamine, sodium bicarbonate-sodium carbonate, boric acid-borate, and borax. Addition of the sulfite will itself increase the pH to within the preferred range, i.e., to approximately 12. But the addition of buffer is desirable to assist in maintaining the pH during the sulfite reaction.

Temperature in both steps: While not narrowly critical, the reaction between the formaldehyde and the PAVE/MA will preferably be conducted in the range of from about 0 to about 300°C., more preferably from about 20° to about 200°C., and most preferably from about 30° to about 100°C. The most optimal temperature for the formaldehyde addition has been found to be approximately 50°C. The contacting of the PAVE/MA with the sulfite will preferably occur at about 0° to about 300°C., more preferably 20° to 200°C., and most preferably 30° to 100°C. The most optimal temperature for the sulfite addition has been found to be about 75°C. However, as stated above, the sulfite treatment can be conducted simultaneously with the formaldehyde treatment.

Pressure: Pressure in both steps may vary widely, but will, in most cases, be conveniently near atmospheric pressure. However, where higher temperatures are to be used, additional pressure may be imposed above the reaction mixture, e.g., by the use of inert gases or by the use of compressed air in order to prevent boiling or excessive evaporation of water.

Time: Reaction time for each step (or for the combined step where formaldehyde and sulfite treatments are carried on simultaneously) is also not narrowly critical and may be in the range of from about 0.1 to about 100 hours, more preferably from about 0.5 to about 50 hours, and most preferably from about 1 to about 10 hours.

Batch or Continuous Basis: While the examples below describe the invention on a batch basis, it may, of course, be practiced on a continuous basis with continuous flows of starting materials into the reactor.

Partial Hydrolysis: It is an advantage of the present invention that the copolymer is partially hydrolyzed during the sulfomethylation process. While the degree of hydrolysis is not precisely determined by available analytical techniques, it is estimated to be within the range of from about 5 to 70 percent hydrolysis of the amide groups which have not reacted with the formaldehyde and sulfite. This partial hydrolysis greatly increases the polarity of the molecule in the finished product, and the sulfomethylation further increases this polarity. In the resultant molecule, polar groups on the polymer tend to strongly repel each other providing excellent dispersibility and good increase in viscosity and screen factor even in relatively dilute aqueous solutions. It is particularly important that these sulfomethylated products of the present invention maintain their high viscosity and screen factor even in the presence of calcium ions. Calcium ions are often encountered in the subterranean formations which contain oil and are known to be deleterious to conventional viscosity and screen factor-increasing agents, including unmodified partially hydrolyzed high molecular weight polyacrylamides, the most commonly used of such agents.

Examples

EXAMPLE 1

Copolymerization

Monomer concentrations of 0.3 to 0.4 moles/liter methyl vinyl ether and 0.3 to 0.4 moles/liter maleic anhydride are used with benzene solvent.

The reaction mixture is thermostatted at reflux, and the initiator comprising $5.0 \times 10^{-4}$ moles/liter benzoyl peroxide is added and the reaction is allowed to continue for 10 hours to obtain a high molecular weight copolymer.

EXAMPLE II

Sulfomethylization 3.0 grams (0.021mole) of Gantrez AN 179 poly(methyl vinyl ether/maleic anhydride) copolymer was dissolved in 250 ml concentrated $NH_4OH$ and allowed to stand for approximately 48 hours without stirring.

Simultaneous sulfomethylation was effected as follows. 2.6594 grams (0.021 mole) sodium sulfite and 250 ml of water are added to the solution produced in the above step. The pH of the resulting solution before reaction is 12.5 and the viscosity is 50.0 centipoises at 3 rpm as measured by a Brookfield viscometer. 7 ml (0.1726 mole) of 37 percent formalin aqueous solution are added and the temperature is adjusted to approximately 50°. Evolution of ammonia is observed during heating and $N_2$ is sparged into the mixture at a slow rate to drive off additional quantities of $NH_3$. The reaction is allowed to continue for approximately 20 hours, after which the sulfonate content is measured as approximately 10 mole percent, based on the moles of sulfonate groups in the molecule on the basis of elemental analysis.

EXAMPLE III

When an aqueous solution containing approximately 0.10 weight percent of the copolymer produced in Example II above, is injected into a Berea sandstone core, the pore volume of which has been first filled with crude oil then flooded with water so as to simulate the tertiary oil remaining after a secondary recovery operation of conventional technique, a substantial amount of the tertiary oil is displaced by the aqueous solution of the present invention and is moved through the core, exiting at the end of the core.

MODIFICATIONS OF THE INVENTION

It should be understood that the invention is capable of a variety of modifications and variations which will be made apparent to those skilled in the art by a reading of the specification and which are to be included within the spirit of the claims appended hereto.

For example, in some applications the thickeners disclosed above may be used as mixtures with each other or with thickeners of distinctly different chemical structures such as partially hydrolyzed high molecular weight polyacrylamides, polyethylene oxide, polyvinylpyrrolidones, and polyvinyl carboxylates. In some cases, the thickener may be incorporated into the surfactant slug itself.

Also, the concentrations of PAVE/MA discussed under "Description of the Preferred Embodiments" should be understood to refer to concentration during the injection step. Where desired, the contact between formaldehyde and sulfite and PAVE/MA may be conducted at higher concentrations with subsequent dilution prior to or during injection.

In the supplemented displacement of petroleum, e.g., in secondary or tertiary petroleum recovery processes, the viscosity control agents of the present invention are formulated with water to provide a viscosity which is not substantially less than, and is preferably greater than, the fluids which they are to displace. The displaced fluids may be petroleum itself, petroleum and water (as is the case in tertiary supplemented recovery operations), or may be a slug of primary dispersing agent, e.g., micellar solution, hydrocarbon, or the like. The displacing agents of the present invention may themselves be driven through the formation by the action of a drive fluid, e.g., water with or without conventional thickening agents. Other techniques, e.g., the "tapering" of viscosity by reducing the concentration of the mobility control agent over the period of the injection process can be employed with the mobility control agents of the present invention.

What is claimed is:

1. In a process for the supplemented recovery of petroleum from formations by injecting aqueous solutions of viscosity-increasing compositions, the improvement comprising injecting into said formations aqueous solutions comprising sulfomethylated copolymers formed by copolymerizing lower alkyl vinyl ether with maleic anhydride to form a copolymer, contacting said copolymer with ammonia to form the ammonium salt of said copolymer, contacting said ammonium salt of said copolymer at from about 0° to about 300°C. with from about 0.01 to about 10.0 moles of formaldehyde per mole of maleic anhydride monomer units contained within said copolymer and contacting said ammonium salt with from about 0.01 to about 2.0 moles of a sulfite selected from the group consisting of ammonium sulfites, ammonium bisulfites, alkali metal sulfites, alkali metal bisulfites, alkaline earth metal sulfites, and alkaline earth metal bisulfites, for each mole of maleic anhydride monomer units contained in said copolymer.

2. The process of claim 1 wherein said ammonium salt is contacted with sulfite at from about 0° to about 300°C.

3. A process according to claim 1 wherein said ammonium salt is first contacted with said formaldehyde for a time sufficient to substantially complete said reaction with said formaldehyde and thereafter contacted with sulfite.

4. A process according to claim 3 wherein the aqueous solution contains from about 50 to about 5,000 parts per million by weight of said sulfomethylated copolymer, the sulfite is selected from the group consisting of: alkali sulfites, alkaline earth sulfites, alkali bisulfites, alkaline earth bisulfites, ammonium sulfite, ammonium bisulfite, the pyrolsulfites and metabisulfites corresponding to any of the foregoing and mixtures of any of the foregoing, and wherein there are present from about 0.01 to about 10 moles of formaldehyde and from about 0.01 to about 2.0 moles of sulfite per mole of maleic anhydride monomer unit in said copolymer, and wherein the temperature is in the range of from about 0° to about 300°C, and each contact is maintained for a reaction time of from about 0.1 to about 100 hours.

5. A process according to claim 1 wherein said ammonium salt is contacted with said formaldehyde and said sulfite substantially simultaneously.

6. A process according to claim 1 wherein the aqueous solution contains from about 50 to about 5000 parts per million by weight of said sulfomethylated copolymer, said sulfonated copolymer having a molecular weight in the range of from about 1 to about 100 million, the sulfite is selected from the group consisting of: alkali sulfites, alkaline earth sulfites, alkali bisulfites, alkaline earth bisulfites, ammonium sulfite, ammonium bisulfite, the pyrosulfites and metabisulfites corresponding to any of the foregoing and mixtures of any of the foregoing, and wherein there are present from about 0.01 to about 10.0 moles of formaldehyde and from about 0.01 to about 2.0 moles of sulfite per mole of maleic anhydride monomer unit in said copolymers, and wherein the temperature is in the range of from about 0° to about 300°C., and the contact is maintained for a reaction time of from about 0.1 to about 100 hours.

7. A process according to claim 5 in which the aqueous solution contains from about 100 to about 2,000 parts per million by weight of said sulfomethylated copolymer, said sulfomethylated copolymer has a molecular weight in the range of from about 1 to about 100 million, there are present from about 0.1 to about 5.0 moles of formaldehyde and about 0.05 to about 1.0 moles of sulfite per mole of maleic anhydride monomer unit in said copolymer, the pH during the contact with the formaldehyde is in the range of from about 8.0 to about 10.5, the pH during the contact with sulfite is in the range of from about 9.5 to about 13.5, the temperature during the contact with formaldehyde and with sulfite is in the range of from about 20° to about 200°C., and the reaction is carried out for about 0.5 to about 50 hours.

\* \* \* \* \*